(12) United States Patent
Nissan-Cohen et al.

(10) Patent No.: US 8,139,645 B2
(45) Date of Patent: Mar. 20, 2012

(54) APPARATUS FOR ENHANCED WIRELESS TRANSMISSION AND RECEPTION OF UNCOMPRESSED VIDEO

(75) Inventors: Yoav Nissan-Cohen, Tel Aviv (IL); Nathan Elnathan, Ra'anana (IL)

(73) Assignee: Amimon Ltd, Herzlia (IL)

( * ) Notice: Subject to any disclaimer, the term of this patent is extended or adjusted under 35 U.S.C. 154(b) by 1507 days.

(21) Appl. No.: 11/552,116

(22) Filed: Oct. 23, 2006

(65) Prior Publication Data

US 2007/0091999 A1    Apr. 26, 2007

Related U.S. Application Data

(60) Provisional application No. 60/729,459, filed on Oct. 21, 2005, provisional application No. 60/740,418, filed on Nov. 28, 2005.

(51) Int. Cl.
H04N 7/12    (2006.01)

(52) U.S. Cl. .......... 375/240.18; 375/240.02; 375/240.26

(58) Field of Classification Search .................. 375/240, 375/240.01, 240.02, 240.03, 240.18, 240.26
See application file for complete search history.

(56) References Cited

U.S. PATENT DOCUMENTS

| | | | |
|---|---|---|---|
| 5,768,535 | A | 6/1998 | Chaddha et al. |
| 6,788,349 | B2 | 9/2004 | Wu et al. |
| 2003/0002582 | A1 | 1/2003 | Obrador |
| 2004/0196404 | A1 | 10/2004 | Loheit et al. |
| 2004/0196920 | A1 | 10/2004 | Loheit et al. |

FOREIGN PATENT DOCUMENTS

WO    WO 2005029737 A2 *  3/2005

OTHER PUBLICATIONS

Skoglund, M., et al. Design and Performance of VQ-Based Hybrid Digital-Analog Joint Source-Channel Codes. IEEE Transactions on Information Theory. vol. 48. No. 3. Mar. 2002.
Mittal, U., et al. Hybrid Digital-Analog (HDA) Joint Source-Channel Codes for Boradcasting and Robust Communications. IEEE Transactions on Information Theory. vol. 48. No. 5 May 2002.
Mittal, U. Broadcasting, Robustness and Duality in a Joint Source-Channel Coding System. New York State University. Aug. 1999.
Schreiber, W. Advanced Television Systems for Terrestrial Broadcasting: Some Problems and Some Proposed Solutions. Proceedings of the IEEE. vol. 83. No. 6. Jun. 1995.

* cited by examiner

*Primary Examiner* — Allen Wong
(74) *Attorney, Agent, or Firm* — Eitan Mehulal Law Group (57) ABSTRACT

A transmitter transmits an essentially uncompressed HDTV video by direct mapping of transformation coefficients of Y—Cr—Cb video components to communication symbols. A main portion of the important transform coefficients is sent in a coarse representation using, for example, QPSK or QAM. The coefficients representing the higher frequency of each of Y—Cr—Cb, as well as the quantization error values of the DC and near DC components, are sent as pairs of real and imaginary portions of a complex number that comprise a symbol. In the transmitter, a history containing certain information of some of the coefficients is maintained for the immediately preceding frame, and if a match is found, instead of repeating sending of these coefficients, additional high-frequency coefficients are sent. In the receiver, a history buffer containing certain information of some of the coefficients is maintained, and upon detection of an error the content of the buffer is used instead.

44 Claims, 4 Drawing Sheets

APPARATUS FOR ENHANCED WIRELESS TRANSMISSION AND RECEPTION OF UNCOMPRESSED VIDEO

CROSS REFERENCE TO RELATED APPLICATIONS

This application claims priority from U.S. Provisional Patent Application No. 60/729,459 filed on Oct. 21, 2005 and U.S. Provisional Patent Application No. 60/740,418 filed on Nov. 28, 2005, each of which is incorporated herewith in its entirety by the reference thereto.

BACKGROUND OF THE INVENTION

1. Field of the Invention

The invention relates to the transmission and reception of uncompressed video over a wireless link. More specifically, the invention relates to a delay-less and buffer-less transmission and reception of uncompressed HDTV video over a wireless link enabled to overcome transmission and reception errors.

2. Discussion of the Prior Art

In many houses, television and/or video signals are received through cable or satellite links at a set-top box at a fixed point in the house. In many cases, it is desired to place a screen at a point a distance from the set-top box by a few meters. This trend is becoming more common as flat-screen using plasma or liquid crystal display (LCD) televisions are hung on a wall. Connection of the screen to the set-top box through cables is generally undesired for aesthetic reasons and/or installation convenience. Thus, wireless transmission of the video signals from the set-top box to the screen is preferred. Similarly, it may be desired to place a computer, game controller, VCR, DVD, or other video source that generates images to be displayed on a screen a distance from the screen.

Generally, the data are received at the set-top box compressed in accordance, for example, with the motion picture expert group (MPEG) format and are decompressed by the set-top box to a high quality raw video signal. The raw video signal may be in an analog format or a digital format, such as the digital video interface (DVI) format or the high definition multimedia interface (HDMI) format. These digital formats generally have a high definition television (HDTV) data rate of up to about 1.5 Giga bits per second (Gbps).

Wireless short range transmission in the home can be done over the unlicensed bands around 2.4 GHz or around 5 GHz, e.g. in the U.S 5.15-5.85 GHz band. These bands are currently used by wireless local area networks (WLAN) where the 802.11 WiFi standard allows maximal data rates of 11 Mbps (802.11b) or 54 Mbps (for 20 MHz bandwidth and the 802.11g/802.11a standards). Using the emerging Multi-input Multi-Output technology the data rate of the emerging 802.11n standard can increase to around 200 Mbps. Another alternative is to use Ultra Wide Band (UWB), which claims to provide 100-400 Mbps.

Because the available data rate is lower than the 1.5 Gbps needed for uncompressed HDTV video, the video generally must be recompressed for wireless transmission, when desired. Known strong video compression methods, e.g. those having a compression factor of above 1:30 require very complex hardware to implement the compression. This is generally not practical for home applications. These compression methods generally transform the image into a different domain by using, for example, wavelet, discrete cosine transform (DCT), or Fourier transforms, and then perform the compression in that domain. In PCT application IL/2004/000779, Wireless Transmission of High Quality Video, assigned to common assignee and incorporated herein in its entirety by this reference thereto, there is shown a method of transmitting video images. The method includes providing high definition video, compressing the video using an image domain compression method, in which each pixel is coded based on a vicinity of the pixel, and transmitting the compressed video over a fading transmission channel.

In U.S. patent publication 2003/002582 to Obrador there is described a wireless transmission of images which are encoded using joint source channel coding (JSCC). The transmitted images are decomposed into a plurality of sub-bands of different frequencies. Image and corresponding boundary coefficients with a lowest resolution are sent first and then image and boundary coefficients with a higher resolution are transmitted. An exemplary JSCC applies channel encoding techniques to the source coded coefficients, providing more protection to more important, i.e. low frequency, coefficients and less protection to less important, i.e. high frequency, coefficients.

In coarse transmission methods, signals are transmitted in the form of symbols. Each symbol can have one of a predetermined number of possible values. The set of possible values of each symbol is referred to as a constellation and each possible value is referred to as a bin. In two dimensional constellations, the distance between neighboring bins affects the immunity of the symbols to noise. The noise causes reception of the symbol in a bin that may be the intended bin. If, due to the noise, the symbol is closer to a different bin than intended, the symbol may be interpreted incorrectly. See Ramstad, *The Marriage of Subband Coding and OFDM Transmission*, Norwegian University of Science and Technology (July 2003).

In U.S. patent application serial numbers; 2004/0196920 and 2004/0196404 by Loheit et al. another scheme is proposed for the transmission of HDTV over a wireless link. The discussed scheme transmits and receives an uncompressed HDTV signal over a wireless RF link which includes a clock that provides a clock signal synchronized to the uncompressed HDTV signal. This scheme also includes a data regeneration module connected to the clock, which provides a stream of regenerated data from the uncompressed HDTV signal. A demultiplexer demultiplexes the stream of regenerated data, using the clock signal, into an I data stream and a Q data stream. A modulator connected to the demultiplexer modulates a carrier with the I data stream and the Q data stream. According to Loheit et al. the RF links operate at a variety of frequency bands from 18 GHz up to 110 GHz, hence requiring sophisticated and more expensive transmitters and receivers.

Transmissions of the types described above also require the use of error detection and error correction means to overcome errors resulting from various transmission and reception faults. One well-known means is the use of an error correction code (ECC) that allows for the correction of the data even if the reception was faulty. However, this solution decreases the effective bandwidth of the channel because many more bits must be sent in addition to the actual data bits. This becomes strenuous, especially when HDTV wireless transmission is necessary. Another way of handling such errors is the use of a retransmit protocol where the receiver, upon detecting an error in reception, requests a retransmit of a portion of the data. This also decreases the bandwidth to an extent, as well as requires at least the transmitter to have a significant buffer to enable such retransmission.

In view of a variety of limitations of the prior art it would be advantageous to provide a solution that enables reliable wireless transmission of an HDTV stream while avoiding the need for complex retransmission requirements, allowing for high-quality transmission of graphics and essentially stationary frames, as well as the error correction at the receive end without the need to handle retransmit protocols nor imposing video frame buffers of large memory capacity.

SUMMARY OF THE INVENTION

A transmitter transmits an essentially uncompressed HDTV video by direct mapping of transformation coefficients of Y—Cr-Cb video components to communication symbols. A main portion of the important transform coefficients is sent in a coarse representation using, for example, QPSK or QAM. The coefficients representing the higher frequency of each of Y—Cr-Cb, as well as the quantization error values of the DC and near DC components, are sent as pairs of real and imaginary portions of a complex number that comprise a symbol. In the transmitter, a history containing certain information of some of the coefficients is maintained for the immediately preceding frame, and if a match is found, instead of repeating sending of these coefficients, additional high-frequency coefficients are sent. In the receiver, a history buffer containing certain information of some of the coefficients is maintained, and upon detection of an error the content of the buffer is used instead.

DETAILED DESCRIPTION OF THE PREFERRED EMBODIMENT

The disclosed invention overcomes the deficiencies of the prior art solutions by providing a scheme that allows the transmission of a video, such as an high-definition television (HDTV) video, over a wireless link using transmission symbols, such as symbols of an OFDM scheme. The inventors have realized that it is possible to map the coefficients of a block of pixels after a de-correlating transformation, or a portion thereof, directly into the transmission symbols. Preferably, a discrete cosine transform (DCT) is performed on a block of pixels of each of the Y, Cr and Cb components of the video. The Y component provides the luminance of the pixel, while the Cr and Cb components provide the color difference information. In a preferred embodiment of the disclosed invention, only a portion of the coefficients are used for transmission purposes, thereby avoiding the very high frequency coefficients and keeping the lower frequency coefficients. Significantly, more of the Y related coefficients are preserved for wireless transmission purposes than those for the other two components. For example, a ratio of at least three coefficients respective of the Y component may be used for each of the Cr and Cb components, e.g. a ratio of 3:1:1. DC coefficients, or proximate coefficients having a larger value, are also represented in a coarse format, also referred to as digital format, i.e. part of the DC value is represented as one of a plurality of constellation points of a symbol. The higher frequency coefficients and, in addition, the quantization errors of the DC and the proximate components whose main part is presented digitally, are grouped in pairs, positioning each pair in a symbol as the real and imaginary values of the complex number. Optionally, a possibly non-linear transformation of these values is represented as a complex number of that mapped to an OFDM component. Furthermore, to overcome artifacts associated with transmission of graphics or essentially stationary images, a transmit history buffer is used to compare the coefficients of a current block the immediately preceding block. This causes the sending of the higher frequency coefficients when it is detected that the coefficients of the previous block and the current block are identical.

In the receiver side, transmission errors are overcome by using an error detector and based on the error using the coefficients of the immediately preceding block, rather than the erroneous data received. In a typical transmission of an HDTV video a single frame is contained in about 1200 OFDM symbols, which are about 14,400 blocks of 8-by-8 pixels.

Following is a description of the principles of a transmitter in accordance with on embodiment of the present invention. A detailed description of the transmitter may be found in U.S. provisional application No. 60/729,459, titled Apparatus and Method for Uncompressed, Wireless Transmission of Video, Reznic et al. assigned to common assignee, and which is hereby incorporated by reference for all that it may contain.

Figure 1:
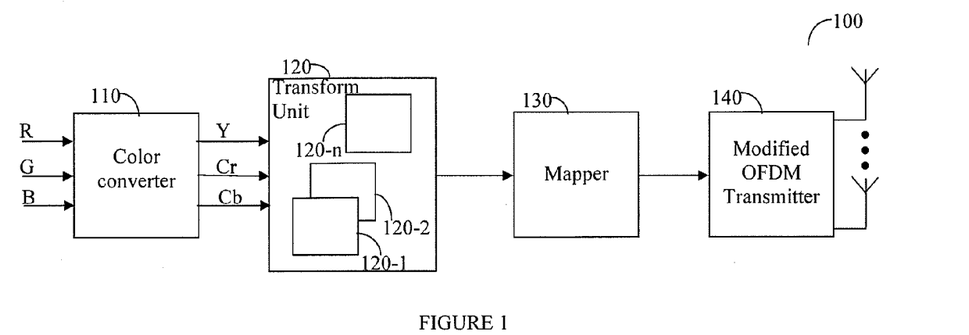
FIG. 1 is a block diagram of coding system in accordance with the disclosed invention.
Figure 2:
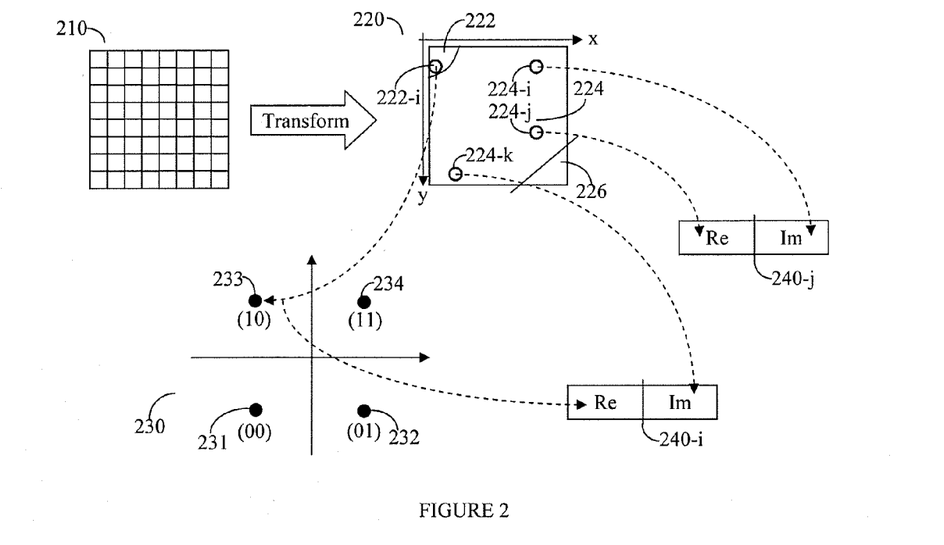
FIG. 2 is a schematic diagram showing an 8-by-8 pixel de-correlation transform, the grouping of the coefficients, and the mapping into coarse and fine symbols in accordance with the disclosed invention.

FIG. 1 shows an exemplary and non-limiting block diagram of system 100 for direct symbol coding in accordance with the disclosed invention. The system 100 receives the red-green-blue (RGB) components of a video signal, for example an HDTV video signal. The RGB stream is converted in the color conversion block 110 to the luminance component Y, and the two color difference components, Cr and Cb. This conversion is well known to persons of ordinary skill in the art. In one embodiment of the disclosed invention, the video begins with a Y—Cr-Cb video signal and, in such a case, there is no need for the color conversion block 110. The Y—Cr-Cb components are fed to a transform unit 120 where a de-correlating transformation is performed on blocks of pixels respective of each of the three components. In one embodiment of the disclosed invention, the block 120 performs a DCT on the blocks of pixels. A block of pixels may contain 64 pixels arranged in an 8-by-8 format, as shown in to FIG. 2. The transform unit 120 may comprise a single subunit for performing the desired transform, for example a DCT, handling the conversions for all the blocks of pixels of an entire video frame for each of the Y—Cr-Cb components. In another embodiment, a dedicated transform subunit is used for each of the Y—Cr-Cb components, thereby accelerating the performance of the system. In yet another embodiment a plurality of subunits are used such that two or more such subunits, capable of performing a desired transform on a block of pixels, are used for each of the Y—Cr-Cb components, thus further accelerating the performance of the system 100. The output of transform unit 120 is a series of coefficients which are fed to a mapper 130. The mapper 130 selects those coefficients from each of the Y—Cr-Cb components which are to be transferred over the wireless link. The mapper 130 also maps the coefficients to be sent to transmission symbols, for example, the symbols of an orthogonal frequency division multiplexing (OFDM) scheme. The symbols are then transmitted using a modified OFDM transmitter 140 that handles the mixed nature of the symbols having a mix of coarse, and fine, also referred to as analog values, as explained in more detail with respect to FIG. 2. In one embodiment of the disclosed invention, a modified OFDM transmitter 140 is connected to a plurality of antennas for the purpose of supporting a multi-input, multi-output (MIMO) transmission scheme, thereby increasing bandwidth and reliability of the transmission. A person skilled in the art further appreciate that a receiver, adapted to receive the wireless signal comprising the symbols transmitted in accordance with the disclosed invention, must be capable of detecting the coarse and fine symbols, reconstruct the respective coefficients, and perform an inverse transform to reconstructing the Y—Cr-Cb components. However, because there is no frame-to-frame compression there is no need for frame buffers in the system. Because the mapping and transform are fast and work on small blocks with no need to consider wide area correlation in the image, nor frame-to-frame correlations, there is practically no delay associated with the operations disclosed herein.

In accordance with the disclosed invention, a de-correlating transform, such as a DCT, is performed on blocks of pixels, for example 8-by-8 pixels, on each of the Y—Cr-Cb components of the video. As a result of the transform on a block, for example a block 210 shown in FIG. 2, a two dimensional coefficient matrix 220 is created. The coefficients closer to the origin, in the area 222, are generally the low frequency and DC portions of each of the Y—Cr-Cb components, such as the coefficient 222-$i$. Higher frequency coefficients may be found in the area 224, such as coefficients 224-$i$, 224-$j$, and 224-$k$, generally having a significantly smaller magnitude than the DC components, for example less than half the amplitude of the DC component. Even higher frequencies may be found in the area marked as 226. The inventors have noted that, to keep an essentially uncompressed video, it is possible to remove the high frequency coefficients in the area 226 for each of the Y—Cr-Cb components. The area 226 may be smaller or larger, depending on the number of coefficients that may be sent in a particular implementation. The main portion of the DC coefficient, for example the most significant bits of the coefficient 222-$i$, is preferably mapped into one of a plurality of constellation points, such as shown in the constellation map 230. A constellation map may be a 4 QAM (QPSK), 16 QAM, or any other appropriate type. Because four constellation points 231 through 234 are shown in constellation map 230, a 4 QAM implementation is taught in this embodiment, and each of the constellation points is mapped to a coarse value from 00 to 11, respectively. The coefficient 222-$i$ is mapped to one such constellation point, depending on its specific value. However, it is also likely to have a quantization error, or in other words, a value corresponding to the difference between the original value and the value represented by the coarse bits that are mapped to constellation points. This error essentially corresponds to the least significant bits of the coefficient's value. Such a mapping is considered a coarse value mapping. The quantization error value may be mapped as part of the symbol 240-$i$ as, for example, the real portion of the complex number constituting the symbol 240-$i$. The higher frequency coefficients are paired and each pair is mapped as a real portion and an imaginary portion of a complex number. For example, the coefficients 224-$i$ and 224-$j$ may be mapped to the imaginary and real portions of a symbol 240-$j$. As noted above, a receiver enabled to receive the symbol stream disclosed herein should be able to recompose the coefficients from the values provided. Such a mapping is considered a fine value mapping.

Figure 3:
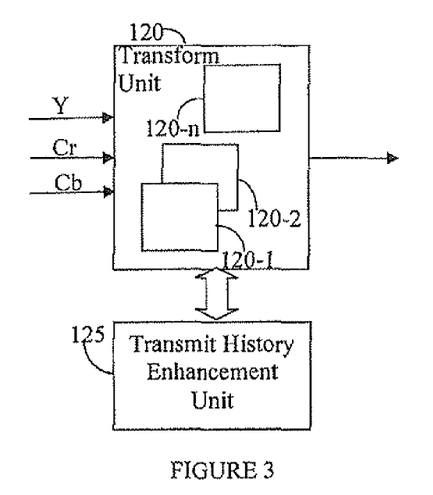
FIG. 3 shows a transform unit connected to a transmit history enhancement unit configured in accordance with the disclosed invention.

FIG. 3 shows an exemplary and non-limiting transform unit 120 that is further configured with a transmit history enhancement unit (THEU) 125. The operation of this unit should be understood as if this combined unit is used in conjunction with the schematic block diagram 100, shown in FIG. 1 and explained in more detail above.

The THEU 125, as configured, includes a memory buffer in which at least information of the low-frequency coefficients, e.g. the coarse, or MSB portion, of all the blocks of a full video frame, i.e. frame '$i$', are kept. It should be noted that such a buffer is significantly smaller than a buffer for a full video frame as typically, about 20 to 40 bits are kept for each block for the information about the low-frequency coefficients. Assuming, for a non-limiting example, that 40 bits are used, then five bytes are necessary to keep this information. Therefore the buffer would require 72,000 bytes (or about 70 kilo bytes) to store the coefficients for 14,400 blocks. In an embodiment of the disclosed invention, the memory may be further extended to include additional coefficients from the high-frequency portion of the DCT of the block. When the next video frame, i.e. frame '$i+1$', is processed then, for each and every block, a portion of the coefficients generated for the block are compared against the respective coefficients stored in the memory buffer of the THEU 125. At a minimum, the portion of the coefficients includes the coarse part of the low-frequency coefficients. As explained above, normally not all the coefficients are sent, and those that correspond to higher frequencies are omitted first. However, in response to a match between the compared coefficients of the previous block and the compared coefficients of the current block, the THEU 125 generates a signal back to transform unit 120 indicating of a match. As a result, the transform unit 120, instead of sending the coefficients as explained in respect of FIGS. 1 and 2 above, it sends an indication that the respective coefficients of the immediately preceding block are to be used, and additional coefficients of the higher frequencies, also referred to as the fine components, not previously sent, are sent instead. The receiver is configured to receive such symbol and use the extended amount of coefficients to generate an enhanced video frame. The values in the memory buffer of the THEU 125 remain untouched, and therefore, if in the following frame, i.e. frame '$i+2$', the same process takes place, thereby ensuring the high quality reception of graphics or generally stationary images. Specifically, it overcomes the artifacts resulting from the omission of coefficients representing high frequencies of the video frame.

Figure 4:
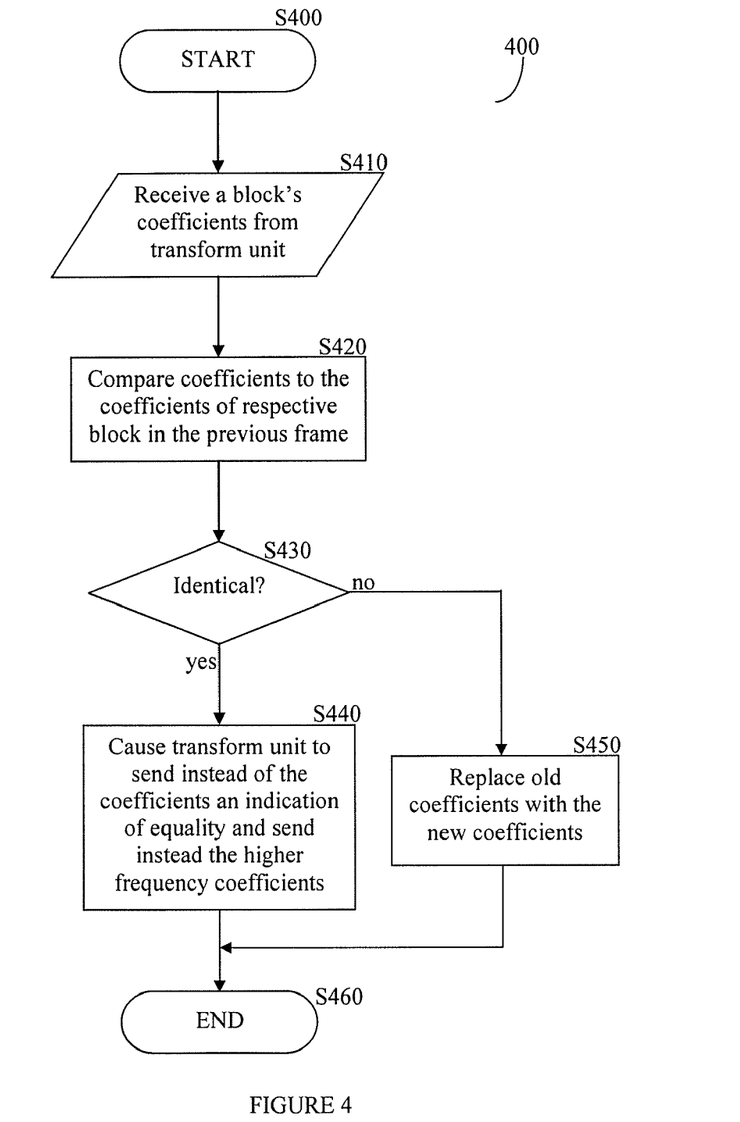
FIG. 4 is a flowchart showing the operation of the transmit history enhancement unit.

The operation of the THEU 125 can be further understood with reference to FIG. 4, where an exemplary and non-limiting flowchart 400 is shown. In step S410, the THEU 125 receives coefficients of a block from the transform unit 120, as well as the location of the block within the video frame. In one embodiment, the coefficients are limited to the coarse part of the low-frequency coefficients, respective of the MSB portions of the DTC of the block. In another embodiment of the disclosed invention, a portion of the higher-frequency coefficients are also used for this purpose.

In step S420, the received coefficients are compared against the coefficients stored for the same block in the memory buffer of the THEU 125.

In step S430, it is checked whether a match was found and if so, execution continues with step S440. Otherwise, execution continues with step S450, where the new coefficients replace the coefficients currently stored in the memory buffer.

In step S440 the THEU 125 causes the transform unit 125, for example by sending a signal, to replace the sending of the coefficients in the manner described in more detail above, by an indication that the receiver should use the coefficients sent with the previous block, and send instead additional coefficients that represent the higher frequencies respective of the block that otherwise would not have been sent. The process ends at step S460.

Figure 5:
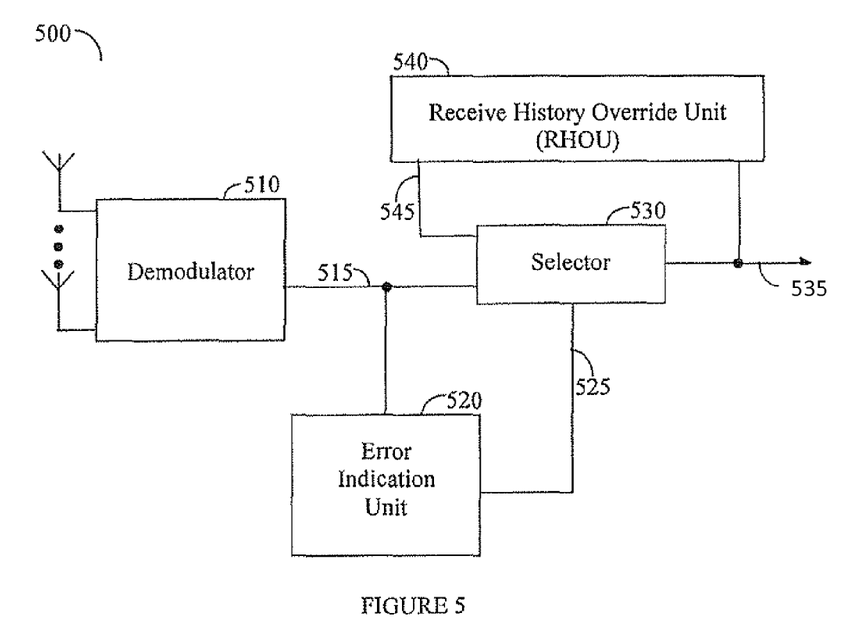
FIG. 5 shows a receiver configured with a receive history override unit in accordance with the disclosed invention.

FIG. 5 shows an exemplary and non-limiting receiver 500 configured with a receive history override unit (RHOU) 540. A demodulator 510 receives a signal via the antennas and performs a demodulation resulting in a series of information symbols on its output 515. These symbols are fed to an error indication unit (EIU) 520. The EIU 520 is configured to detect an error. Such detection may be, but is not limited to, detection of errors as a result of a forward error-correction (FEC) scheme, cyclical redundancy checking (CRC), or an indication that the signal-to-noise (SNR) is low and hence the transmission is error prone.

In accordance with one embodiment of the present invention the error detection is performed be means of CRC. Specifically the EIU 520 includes a CRC engine (not shown) that receives, for each transmitted frame, a CRC block that includes 64 coarse bits and a CRC byte. The CRC engine performs CRC calculation on the 64 bits data. The CRC calculation may be done, for example, by dividing the code word by a generator polynomial and checking if the remainder equals to zero. If the CRC passes, the eight data bytes (i.e., the CRC block without the CRC data) are written to the memory buffer in the RHOU 540 and being transferred to the modified OFDM transmitter 140. If the CRC fails the eight bytes are ignored and the data is being read from the buffer in the RHOU 540.

Regardless of the specific nature of the error, the EIU 520 generates a signal to the selector 530 when an error is detected. As long as there is no indication of an error, the symbol stream on 515 is transferred through the selector 530 to its output signal 535 for further processing by following units (not shown). Upon detection of an error, the signal from the EIU 520 causes the selector 530 to switch for information from the RHOU 540. The RHOU 540 is configured to replace the coefficients that were received in error. To perform this task, the RHOU 540 comprises a memory buffer into which the coefficients of each of the blocks is stored. In one embodiment of the disclosed invention, only the coarse part of the low-frequency coefficients of the immediately previous video frame are stored in the RHOU 540. Such a buffer is significantly smaller than a buffer for a full video frame because typically, about 20 to 40 bits are kept for each block for the low-frequency coefficients. Assuming, for a non-limiting example, that 40 bits are used, then five bytes are necessary to keep these coefficients. Therefore, the buffer would require 72,000 bytes (or about 70 kilo bytes) to store the coefficients for 14,400 blocks. In an embodiment of the disclosed invention, the memory may be further extended to include additional coefficients from the high-frequency portion of the DCT of the block. The stream from the modulator 510 and the RHOU is synchronized so that information symbols from the previous frame are presented to the selector with their respective value from the current frame. The output 535 of the selector 530 is also fed back to the RHOU 540 for restoring at the appropriate location, being ready for use for the next symbol stream.

Figure 6:
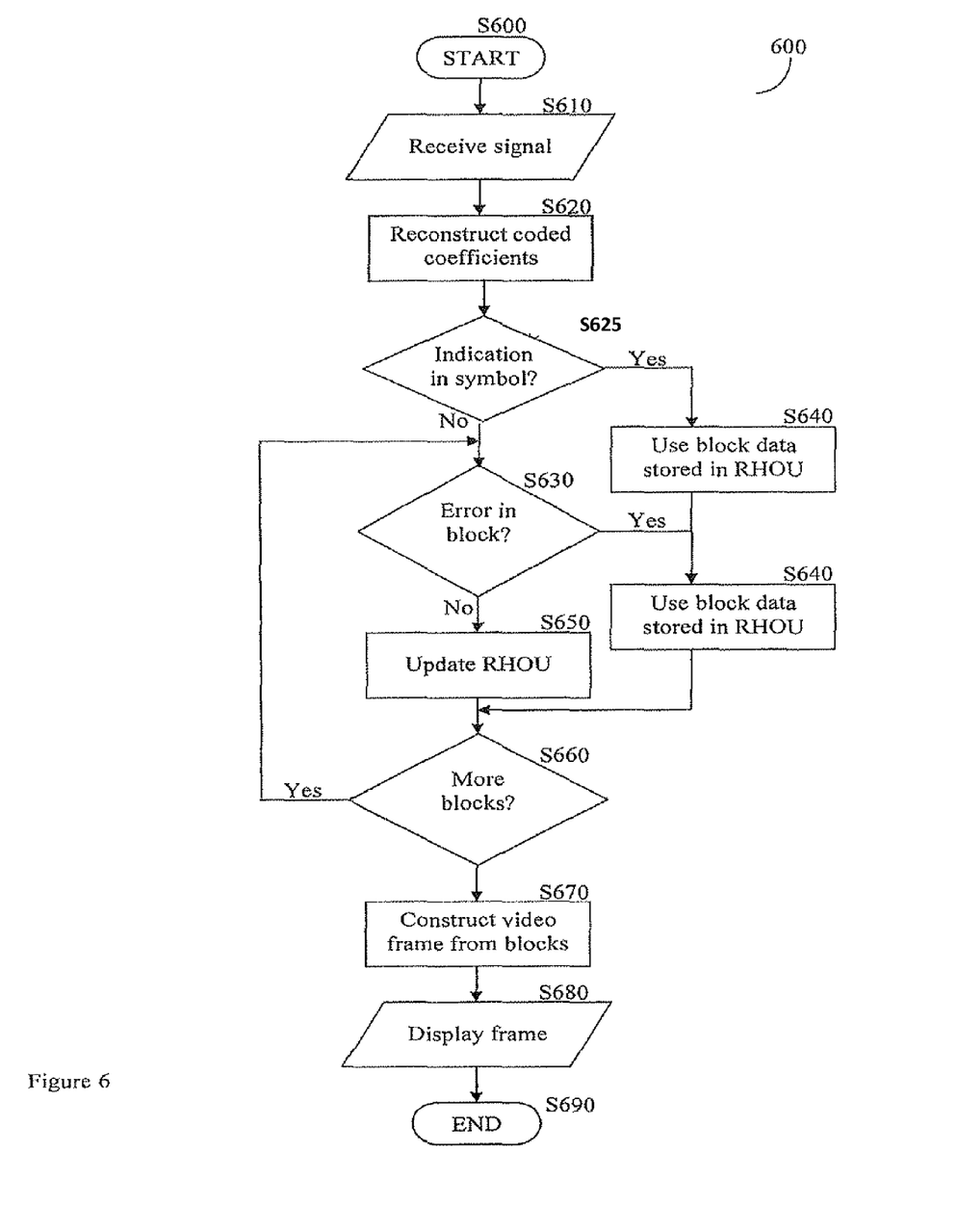
FIG. 6 is a flowchart showing the operation of a receiver configured with a transmit history enhancement unit.

The operation of the receiver 500 in general and the RHOU 540 in particular will be further understood with respect of FIG. 6, which is an exemplary and non-limiting flowchart 600. The process starts at step S600. In step S610, a signal is received carrying a plurality of symbols transmitted in accordance with the disclosed invention.

In step S620, the demodulator 510 reconstructs the information symbols.

In step S625 the symbol is checked to determine whether it contains and an indication instructing the receiver to use the coefficients sent with the previous block, and if so execution continues; otherwise, proceeding to step S630.

In step S630, the symbol is checked and if an error in a block was found, and if so execution continues with step S640. Otherwise, execution continues with step S650 that causes the use of the respective block from the previous transmission, and, thereafter, execution continues with step S660.

In step S640, the RHOU 540 is updated with the new block, replacing the value of the preceding respective block.

In step S660, it is checked whether additional blocks are to be checked for this video frame, and, if so, execution continues with step S630. Otherwise, execution continues with step S670 where the video frame is constructed form the plurality of blocks.

In step S680 the video frame is displayed. The process stops at step S690.

Although the invention is described herein with reference to several embodiments, including the preferred embodiment, one skilled in the art will readily appreciate that other applications may be substituted for those set forth herein without departing from the spirit and scope of the invention. The invention may be further implemented in hardware, software, or any combination thereof. Accordingly, the invention should only be limited by the following Claims.

The invention claimed is:

1. An apparatus for wireless transmission of a substantially uncompressed, high definition video signal without substantial delay, comprising:
   means for receiving uncompressed video signal components;
   means for performing a de-correlating transform on said uncompressed video signal components;
   means for sending a first subset of said transformed coefficients by removing a portion of said transformed coefficients when said coefficients do not compare to respective, previously calculated coefficients, and for sending a second subset of said transformed coefficients that were not previously sent when said transformed coefficients do compare to said respective, previously calculated coefficients; and
   means for mapping each remaining coefficient to a transmission symbol.

2. The apparatus of claim 1, said means for sending a subset of transformed coefficients includes removing a portion of said transform coefficients without dependency on a previous frame of said high definition video signal.

3. The apparatus of claim 1, wherein transmission of said high definition video signal is buffer-less.

4. The apparatus of claim 1, said de-correlating transform comprising:
   a discrete cosine transform (DCT).

5. The apparatus of claim 1, said transmission symbol comprising:
   a symbol of an orthogonal frequency division multiplexing (OFDM) transmission scheme.

6. The apparatus of claim 1, said means for sending a subset of the transformed coefficients further comprising a transmit history memory buffer.

7. The apparatus of claim 6, said means for sending a subset of the transform coefficients further comprising:

a comparator for comparing coefficients of said previously calculated coefficients with currently calculated coefficients.

8. The apparatus of claim 7, wherein only low-frequency coefficients are compared.

9. The apparatus of claim 8, wherein a portion of high-frequency coefficients is compared.

10. The apparatus of claim 1, said uncompressed components having a component coarse format comprising a luminance signal and color difference signals.

11. The apparatus of claim 10, further comprising:
means for converting a color space of said high definition video signal into said component coarse format.

12. The apparatus of claim 1, said means for sending a subset of said transformed coefficients includes removing only a sufficient number of said transformed coefficients to maintain a substantially uncompressed wireless transmission of said high definition video signal.

13. The apparatus of claim 12, said means for sending a subset of said transformed coefficients includes leaving between forty-five and sixty four out of a total of sixty four of said coefficients with respect to a luminance signal of said high definition video signal.

14. The apparatus of claim 12, said means for sending a subset of said transformed coefficients includes leaving between ten and twenty out of a total of sixty four coefficients with respect to color difference signals of said high definition video signal.

15. The apparatus of claim 1, said means for mapping further comprising:
means for separating said remaining coefficients into a first group comprising low frequency coefficients and a second group comprising high frequency coefficients.

16. The apparatus of claim 15, said means for mapping further comprising:
means for separating coefficients of said first group into a first value comprising most-significant bits of said coefficient and for mapping said most-significant bits to one of a plurality of constellation points of a symbol, and into a second value comprising least-significant bits of said coefficient.

17. The apparatus of claim 15, said means for mapping further comprising:
means for representing a complex value of a symbol in an OFDM transmission scheme, wherein a first coefficient from said second group comprises a real portion of said complex value and a second coefficient from said second group comprises an imaginary portion of said complex value.

18. The apparatus of claim 1, said high definition video signal having a transmission rate comprising at least 45 frames per second.

19. The apparatus of claim 1, said high definition video signal having an uncompressed data rate greater than 100 Mbit per second.

20. The apparatus of claim 1, said high definition video signal having an uncompressed data rate that is greater than 0.6 Gbit per second.

21. The apparatus of claim 1, said means for performing a de-correlating transform processing a block of pixels of said high definition video signal.

22. The apparatus of claim 21, said block of pixels comprising a rectangle of eight pixels by eight pixels.

23. The apparatus of claim 21, said means for performing a de-correlating transform processing a plurality of blocks of pixels of said high definition video signal in parallel.

24. The apparatus of claim 1, wherein said storage means is smaller than one of:
100 kilobytes, and 1,500 kilobytes.

25. A method for wireless transmission of a substantially uncompressed high definition video signal, comprising:
receiving uncompressed components of said high definition video signal;
performing a de-correlating transform on said uncompressed video signal components;
sending a subset of transform coefficients by removing a portion of said transform coefficients when the coefficient do not compare to the respective previously calculated coefficients, or sending those coefficients not previously sent when the coefficients do compare to the respective previously calculated coefficients; and
mapping each remaining coefficient to a transmission symbol.

26. The method of claim 25, wherein only low-frequency coefficients is compared.

27. The method of claim 26, wherein a portion of high-frequency coefficients is compared.

28. The method of claim 25, wherein said step of removing a portion of said coefficients is performed without dependency on a previous frame of said high definition video signal.

29. The method of claim 25, said de-correlating transform comprising a discrete cosine transform (DCT).

30. The method of claim 25, said transmission symbol comprising a symbol of an orthogonal frequency division multiplexing (OFDM) transmission scheme.

31. The method of claim 25, further comprising the step of:
converting a color space of said high definition video signal into a component coarse format.

32. The method of claim 25, further comprising the step of:
transmitting a symbol stream with an OFDM transmitter.

33. The method of claim 32, said step of transmitting said symbol stream further comprising the step of:
transmitting over a multi-input multi-output (MIMO) link.

34. The method of claim 25, said step of sending a subset of said transformed coefficients further comprising the step of:
removing only a sufficient number of said coefficients to maintain a substantively uncompressed wireless transmission of said high definition video signal.

35. The method of claim 34, said step of sending a subset of said transformed coefficients further comprising the step of:
leaving between forty five and sixty four out of a total of sixty four coefficients with respect to a luminance signal of said high definition video signal.

36. The method of claim 34, said step of sending a subset of said transformed coefficients further comprising the step of:
leaving between ten and eighteen out of a total of sixty four coefficients with respect to color difference signals of said high definition video signal.

37. The method of claim 25, said step of mapping further comprising the step of:
separating remaining coefficients into a first group comprising low frequency coefficients and a second group containing high frequency coefficients.

38. The method of claim 37, said step of mapping further comprising the step of:
separating coefficients of said first group into a first value comprising most-significant bits of said coefficient, and mapping said most-significant bits to one of a plurality of constellation points, and into a second value comprising least-significant bits of said coefficient.

39. The method of claim 38, said step of separating said coefficients further comprising the step of:

mapping said most significant bits to a plurality of symbols.

40. The method of claim 38, said step of mapping further comprising the step of:
representing a complex value of a symbol, wherein a second value of a first coefficient comprises a real portion of said complex value and a second value from another coefficient comprises an imaginary portion of said complex value.

41. The method of claim 38, said step of mapping further comprising the step of:
representing a complex value of a symbol in an OFDM transmission scheme, wherein a first coefficient from said second group comprises a real portion of said complex value and a second coefficient from said second group comprises an imaginary portion of said complex value.

42. The method of claim 25, said step of performing a de-correlating transform further comprising the step of:
processing a block of pixels of said high definition video signal.

43. The method of claim 42, said block of pixels comprising a rectangle of eight pixels by eight pixels.

44. The method of claim 25, said uncompressed components comprising a component coarse format, comprising a luminance signal and color difference signals.

* * * * *